United States Patent
Bi et al.

[11] Patent Number: 5,835,848
[45] Date of Patent: Nov. 10, 1998

[54] RANGE REPEATER FOR A TRANSMISSION SYSTEM

[75] Inventors: Qi Bi, Morris Plains; Robert Evan Myer, Denville, both of N.J.

[73] Assignee: Lucent Technologies INC., Murray Hills, N.J.

[21] Appl. No.: 774,546

[22] Filed: Dec. 30, 1996

[51] Int. Cl.$^6$ ..................................................... H04B 7/14
[52] U.S. Cl. ........................... 455/24; 455/63; 455/67.4; 455/296; 455/278.1
[58] Field of Search .................................. 455/9, 11.1, 14, 455/15, 24, 63, 67.1, 126, 115, 296, 302, 303, 67.4, 278.1

[56] References Cited

U.S. PATENT DOCUMENTS 4,383,331  5/1983  Davidson ..................................... 455/24
4,475,243  10/1984  Batlivala et al. ........................... 455/24
4,952,193  8/1990  Talwar ........................................ 455/63

Primary Examiner—Nguyen Vo
Attorney, Agent, or Firm—Lester H. Birnbaum

[57] ABSTRACT

The invention is a repeater for a telecommunications transmission system such as a CDMA wireless system. The repeater reduces leakage by using a feedback signal whose amplitude and phase are adjusted in response to the amplitude and phase of a sampled input signal when a switch turns off the normal output of the repeater for a short period of time. In one embodiment, a pilot signal is transmitted during this time period so that the sampled input is the leakage signal. In another embodiment, the sampled input is the normal transmission signal received during the time period.

9 Claims, 3 Drawing Sheets

RANGE REPEATER FOR A TRANSMISSION SYSTEM

FIELD OF THE INVENTION

This invention relates to telecommunications transmission systems and in particular to a repeater which may be used in a wireless transmission system.

BACKGROUND OF THE INVENTION

In standard wireless systems, such as Code Division Multiple Access (CDMA) systems, there will be areas that cannot normally be covered by a cell site because of a weakening of signals due to terrain or other structural obstacles, a condition known as shadow fading. Coverage can often be improved by increasing the cell site transmitted power, but this approach may not be efficient.

An alternative approach for improving coverage is to use a range repeater to boost the power of a transmitted signal. A system employing a repeater is illustrated in FIG. 1. As shown, the repeater, 10, will receive signals from the base station, 11, at a frequency, $f_1$, and transmit signals to the station at a frequency, $f_2$, using a highly directional dish antenna, 13. The repeater, 10, will also transmit to the wireless terminal, 12, at the frequency $f_1$ and receive at the frequency $f_2$ using an omni or directional antenna, 14. Since the links between the repeater and base station and between the repeater and terminal are at the same set of frequencies, interference can be a significant problem.

SUMMARY OF THE INVENTION

The invention is a repeater including means for receiving input signals and means for transmitting output signals. The repeater further includes means for sampling an output signal and for feeding back the sampled output signal so as to subtract any leakage signal from an input signal. Switching means turns off an output signal for a first designated time interval. Means are provided for sampling an input signal during the first time interval and determining the amplitude and phase of the signal. The amplitude and phase of the feedback signal are then adjusted based on the amplitude and phase of the input signal received during the designated time interval.

BRIEF DESCRIPTION OF THE DRAWING

These and other features of the invention are delineated in detail in the following description. In the drawing.

It will be appreciated that, for purposes of illustration, these figures are not necessarily drawn to scale.

DETAILED DESCRIPTION

Figure 1:
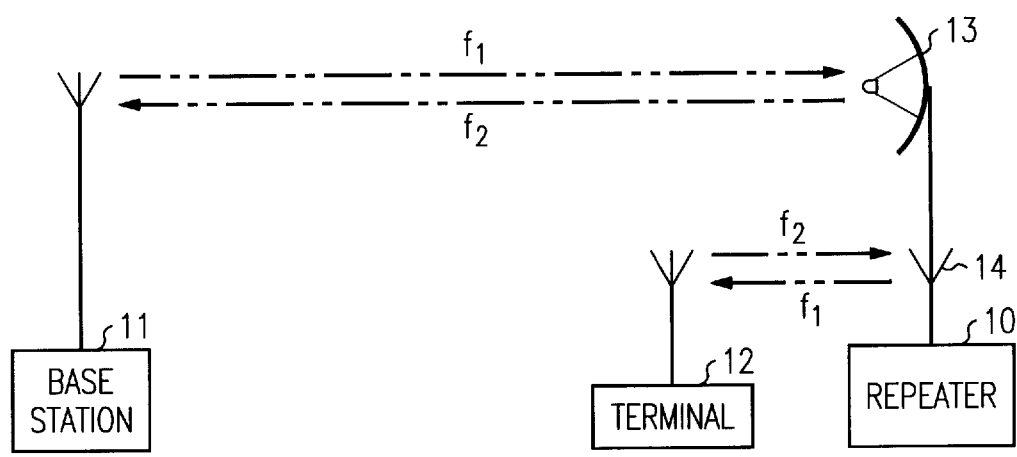
FIG. 1 is a schematic block diagram of a system which can include the present invention.

Referring now to the drawings, in which like reference numerals identify similar or identical elements, FIG. 1 illustrates a system, described above, which can use a repeater in accordance with the invention.

Figure 2:
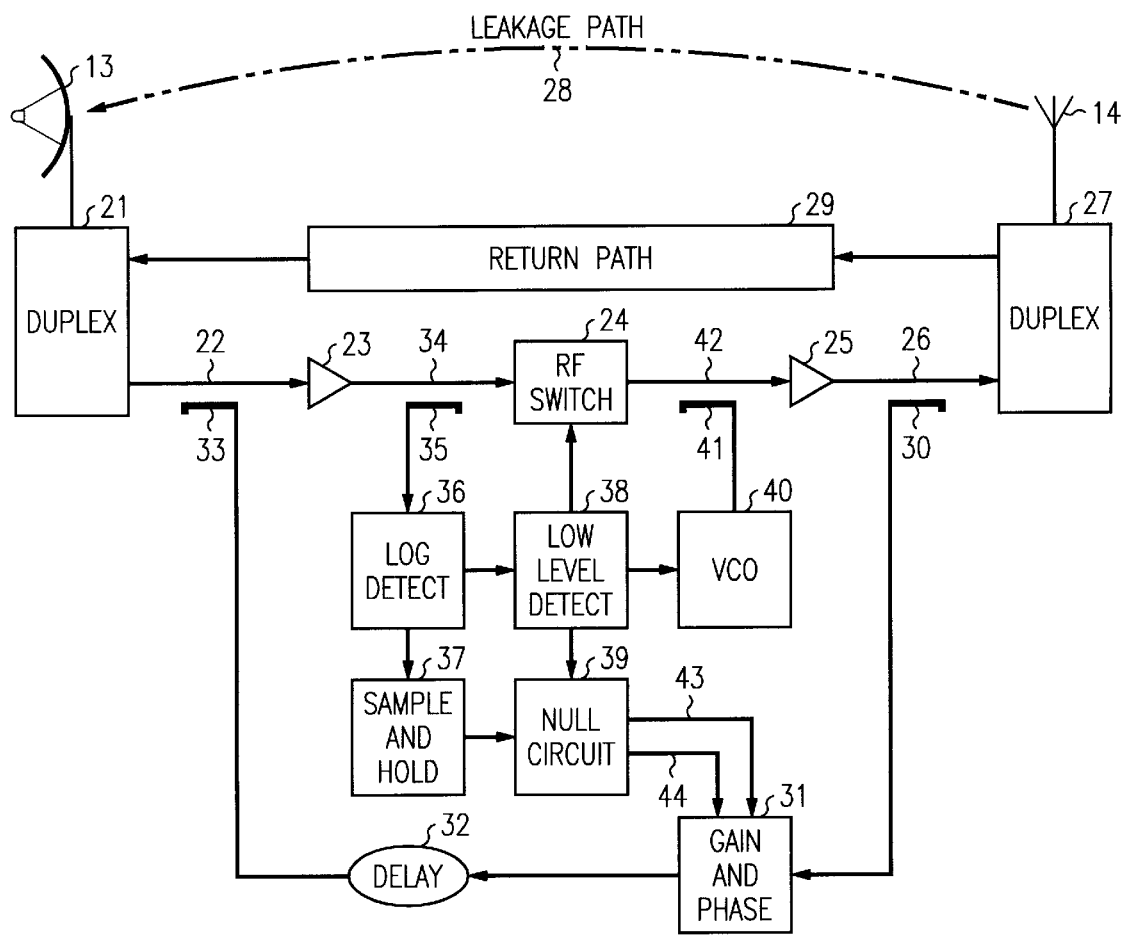
FIG. 2 is a schematic block diagram of a repeater in accordance with an embodiment of the invention.

FIG. 2 illustrates a repeater in accordance with a first embodiment. The dish antenna, 13, which communicates with the base station, 11 of FIG. 1, is connected to a duplexer, 21. The input signal from the base station is connected from the duplexer by means of a coaxial cable, 22, to a low noise amplifier, 23. The output of the amplifier, 23, is connected to a standard RF switch, 24. The output of the switch, 24, is connected to a transmitter amplifier, 25, whose output is connected by means of a coaxial cable, 26, to another duplexer, 27. The output of the duplexer, 27, is transmitted by means of the antenna, 14, to the wireless terminal, 12 of FIG. 1. As illustrated by the dashed line, 28, some of the signal transmitted to the terminal will be picked up by the dish antenna, 13, thereby creating a leakage path which interferes with the input signal from the base station. A similar problem exists with regard to signals received from the terminal by antenna, 14, and transmitted to the base station on antenna 13. (The return path circuitry is illustrated by box, 29, and is not described since it is identical to the circuitry described herein except connected in the reverse direction.)

A directional coupler, 30, is used in order to pick up or sample a portion of the transmitted signal from amplifier, 25. The directional coupler, 30, is coupled to standard circuitry, 31, which adjusts the phase and amplitude (gain) of the sampled signal in response to circuitry to be described. The output of the gain and phase circuitry, 31, is coupled to a delay line, 32, whose output is coupled to a directional coupler, 33, at the input to the low noise amplifier, 23.

An additional directional coupler, 35, at the output of the low noise amplifier, couples amplifier, 23, to the log detector, 36, which has one output connected to a sample and hold circuit, 37, and another output connected to a low level detector, 38. The output of the sample and hold circuit, 37, is connected to a null circuit, 39, as is one of the outputs of the low level detector, 38. The low level detector also has an output connected to the RF switch, 24, and an output connected to a voltage controlled oscillator (VCO), 40. The output of the VCO is connected to a directional coupler, 41, which is applied to a cable, 42, connecting the switch, 24, to the amplifier, 25. The null circuit, 39, has two outputs, one on lead 43 for phase adjustment and one on lead 44 for amplitude adjustment, connected to the gain and phase circuitry, 31.

In operation, during normal transmission from the base station to the terminal, the sampled output signal picked up by directional coupler, 30, will provide a feedback signal which is adjusted in gain and phase by circuit 31 and delayed by delay line 32 so as to match the gain and delay of any leakage signal from antenna 14 to antenna 13, but which is 180 degrees out of phase with the leakage signal. Thus, when the feedback signal is introduced in coupler 33, the leakage signal will be subtracted from the desired transmitted signal.

In order to establish the appropriate settings for gain, phase, and delay, the circuit makes use of coupler, 35, which picks up the signals appearing on cable 34. The log detector, 36, will convert the RF signal to a detected signal in volts on a log scale and transmit the signal to the low level detector, 38. When the detected signal falls below a predetermined desired value, e.g., 0.5 volts, the low level detector, 38, will turn off (open) RF switch, 24. At the same time, the low level detector will trigger the VCO, 40, to transmit a pilot signal to coupler 41 and onto cable 42. The pilot signal will typically be in the form of a 100 nanosecond burst of RF, whose center frequency is mid band of $f_1$ or $f_2$. The pilot signal will be transmitted through amplifier, 25, duplexer 27, antenna, 14, and over the leakage path, 28, to be received by antenna 13 and sent through duplexer, 21, and amplifier, 23.

A portion of the pilot signal will also be picked up by coupler, 30, and sent over the feedback path which includes the gain and phase adjuster, 31, and the delay line, 32. The coupler, 35, will pick up a portion of the pilot signal which was transmitted over the leakage path, and the log detector, 36, will convert the RF signal into a detected signal. The resulting signal will be sampled and held by the circuit, 37, and transmitted to a null circuit, 39, which will compare the just-received sample to a sample which was taken during a previous test interval to determine if the amplitude of the leakage (pilot) signal is increasing or decreasing. Based on this comparison, the null circuit, 39, will transmit a signal over leads 43 and 44 to adjust the gain and/or phase of the feedback signal in order to reduce the interference from the leakage signal. The delay line, 32, can also be adjusted during initial set up of the repeater to match the delay of the leakage signal by trimming its length.

Thus, by taking several samples using the transmission of the pilot signal during different test intervals, the gain and phase parameters can be adjusted until the leakage signal is close to zero. Typically, 1000 test intervals will be utilized in a period of 1 second to achieve this result. The test interval, during which the RF switch, 24, is open and the pilot signal is transmitted, will be short, typically, 100 nanosecond, so as not to interfere with normal transmission. When the test interval is over, the RF switch, 24, will be closed by the low level detector 38. The low level detector, 38, is desirable to initiate the test interval when the normal transmission is at a low amplitude in order to minimize spurious signals.

Figure 3:
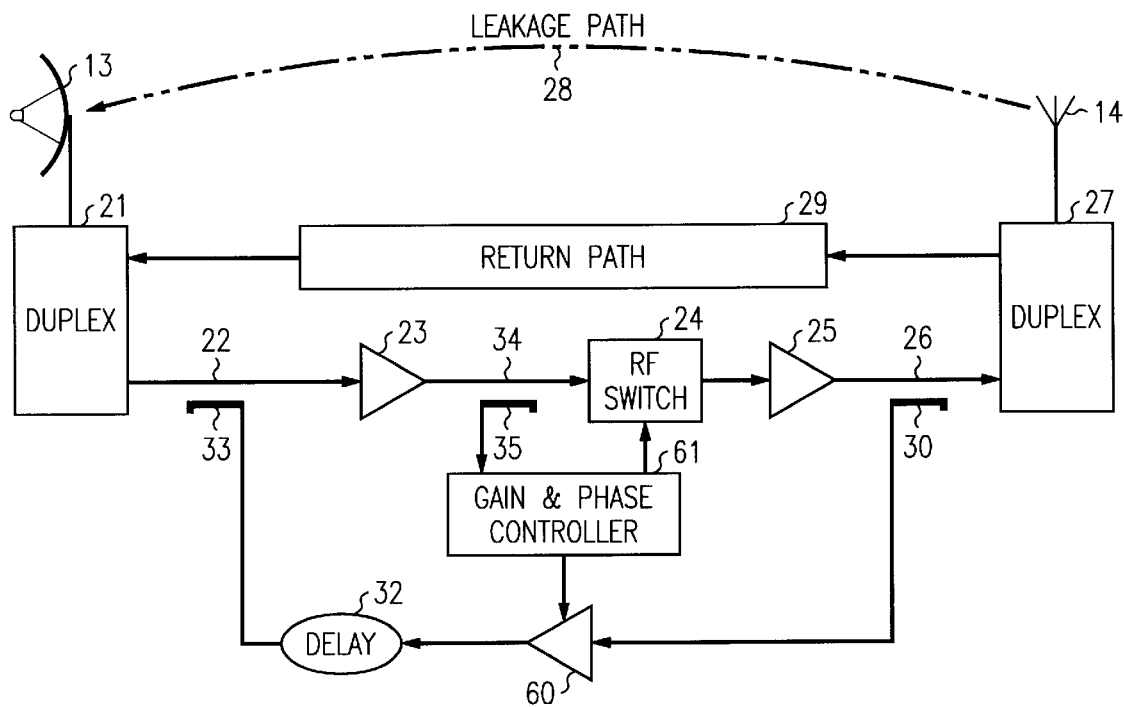
FIG. 3 is a schematic block diagram of a repeater in accordance with a further embodiment of the invention.
Figure 4:
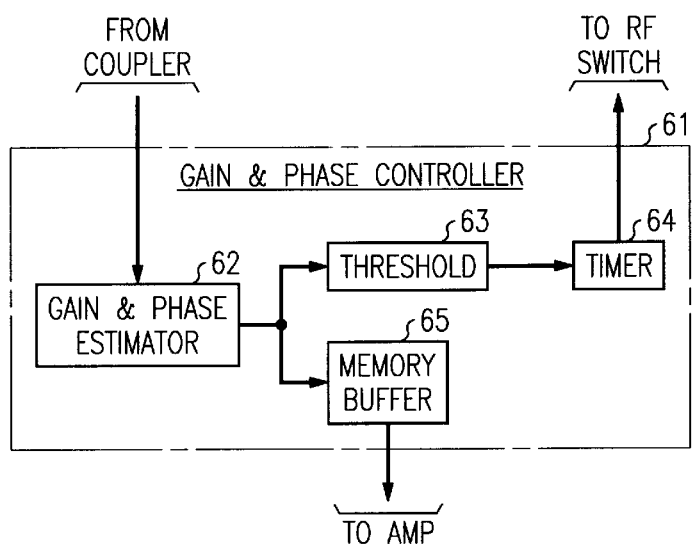
FIG. 4 is a block diagram illustrating further detail in a portion of the circuit of FIG. 3.

FIG. 3 illustrates an alternative embodiment where a pilot signal is not needed. The repeater of FIG. 3 utilizes, instead, a gain and phase controller, 61, which is illustrated in more detail in FIG. 4. The gain and phase controller, 61, includes a standard gain and phase estimator, 62, with an input connected to the coupler, 35, and an output connected to a threshold circuit, 63. The output of the threshold circuit is connected to a timer, 64, which, in turn, is connected to the RF switch, 24. The output of the gain and phase estimator is also coupled to a memory buffer, 65, which is, in turn, coupled to an amplifier, 60, in the feedback path. The amplifier, 60, has an input coupled to the coupler, 30, and its output coupled to the delay line, 32.

In operation, the threshold circuit, 63, will open the normally closed switch, 24, when the amplitude of the input signal falls below a predetermined value, e.g. 0.5 volts. Opening the switch, 24, cuts off transmission of any signals over antenna 14, thereby eliminating any leakage signal appearing on antenna 13 during the test interval. Consequently, the signal picked up by coupler 35 from cable 34 will be the normal input signal from the base station without any leakage component. The estimator, 62, will measure the gain and phase of the normal input signal. The timer, 64, will then close the switch, 24, after a predetermined short period of time, e.g., 100 nanosecond. This results in the resumption of transmission including the leakage component. The estimator, 62, again measures the gain and phase of the input signal, and the gain and phase of the leakage component is determined by simple subtraction. The values of the gain and phase of the leakage component are then stored in the memory buffer, 65, and are used to set the gain and phase of the amplifier, 60, which, in turn adjusts the gain and phase of the feedback signal from coupler 30.

Several samples are taken during different subsequent test intervals until the leakage signal is close to zero. The delay, 32, is again set by trimming the delay line during set up in the field.

Thus, it will be appreciated that the primary difference between the circuits of FIGS. 2 and 3 is that the latter compares the total input signal with the signal absent the leakage component in order to determine the amplitude and phase of the leakage component, while the former measures the amplitude and phase of the leakage component directly using a pilot signal.

While the invention has been described with regard to a CDMA wireless system, it should be apparent that the repeater could be used in any transmission system employing electromagnetic waves at any frequency of the spectrum.

The invention claimed is:

1. A repeater comprising:

means for receiving input signals and means for transmitting output signals;

means for sampling an output signal and for feeding back the sampled output signal so as to subtract any leakage signal from an input signal;

means for stopping transmission of an output signal for a first designated time interval during which a received input signal is sampled;

means for determining the amplitude and phase of the input signal received during the interval; and means for adjusting the amplitude and phase of the feedback signal based on the amplitude and phase of the input signal received during the designated time interval.

2. The repeater according to claim 1 further comprising a delay line coupled to the means for adjusting the amplitude and phase of the feedback signal.

3. The repeater according to claim 1 wherein the means for stopping transmission includes means for determining the amplitude of an input signal and opening a switch when the amplitude falls below a predetermined threshold.

4. The repeater according to claim 1 further comprising means for injecting a pilot signal into the means for transmitting output signals during said interval, whereby the input signal sampled during the interval is the leakage signal.

5. The repeater according to claim 4 wherein the means for injecting the pilot signal comprises a voltage controlled oscillator.

6. The repeater according to claim 1 wherein the means for sampling the input signal comprises means for comparing the amplitude and phase of the input signal with the amplitude and phase of an input signal from a second time interval.

7. The repeater according to claim 6 wherein the second time interval is a previous interval during which the output signal is not transmitted.

8. The repeater according to claim 6 wherein the second time interval is a subsequent interval during which the output signal is not transmitted.

9. The repeater according to claim 1 wherein the input signal sampled during the first designated time interval is a received transmission signal without a leakage component.

* * * * *